United States Patent [19]

Mulasmajic

[11] 3,740,597
[45] June 19, 1973

[54] PRIME MOVER SYSTEM HAVING ROTATING AND RECIPROCATING MULTI-AMPLIFICATION

[76] Inventor: Dzemal Mulasmajic, 338 Pleasant Hill Boulevard, Palatine, Ill. 60067

[22] Filed: Sept. 17, 1971

[21] Appl. No.: 181,379

[52] U.S. Cl. ............................................... 310/80
[51] Int. Cl. ............................................ H02k 7/06
[58] Field of Search ................. 310/80, 82, 84, 74, 310/153, 113, 15, 36, 37; 74/15

[56] References Cited
UNITED STATES PATENTS

| | | | |
|---|---|---|---|
| 3,402,308 | 9/1968 | Henschke | 310/80 |
| 2,602,098 | 7/1952 | Ross | 310/113 |
| 3,379,906 | 4/1968 | Spohr | 310/80 |
| 3,422,297 | 1/1969 | De Bennetot | 310/80 |
| 3,424,012 | 1/1969 | Hirmann | 310/80 |
| 3,513,340 | 5/1970 | Appleton | 310/113 |

*Primary Examiner*—R. Skudy
*Attorney*—Hill, Sherman, Meroni, Gross & Simpson

[57] ABSTRACT

A rotatable shaft carries a pair of multi-pole magnets which attract and repel similar magnets disposed therebetween and carried on a wheeled carriage. The poles of the magnets are aligned annularly about the axis of rotation of the shaft and annularly positioned so that two magnets are attracting while the other two magnets are repelling. The shaft can be rotated by any expedient arrangement, such as, manual, small electric motor, etc. This arrangement may include a feedback system connected between the reciprocating carriage and the shaft. In one embodiment, the feedback system comprises a fluid circuit including a compressor connected to the carriage, an air tank connected to the compressor and an air-driven motor connected between the air tank and the shaft. In another embodiment, a mechanical motion translation device is connected between the carriage and the shaft for converting the reciprocating motion into rotary motion.

29 Claims, 13 Drawing Figures

Patented June 19, 1973

INVENTOR.
DZEMAL MULASMAJIC

BY

ATTORNEYS

Patented June 19, 1973

INVENTOR.
DZEMAL MULASMAJIC

BY Hill, Sherman, Meroni, Gross & Simpson ATTORNEYS

PRIME MOVER SYSTEM HAVING ROTATING AND RECIPROCATING MULTI-AMPLIFICATION

DESCRIPTION

This invention relates to a prime mover system which utilizes rotating and reciprocating permanent magnets for motion conversion and power amplification.

Prime mover systems generally employ apparatus for converting mechanical, electrical or chemical energy into a useful mechanical energy, e.g., a water wheel, an electric motor, an internal combustion engine. Each of these types of energy conversion apparatus have one or more disadvantageous characteristics, such as immobility, inefficiency, or applicability only to low power uses.

The primary object of the present invention is to provide a prime mover system of unique design which does not suffer from the aforementioned disadvantages and which may be constructed in sizes suitable for application over a wide range of power requirements, e.g., driving small advertising displays, large machine tool devices, and can be utilized in any upright, inverted or rotated position.

The above and other objects of the invention are realized through the provision of a prime mover system which includes at least one pair of multi-pole magnets each having a plurality of annularly disposed magnetic poles of alternate polarity facing the magnetic poles of the other magnet. One of the magnets is mounted for rotation while the other magnet is mounted for reciprocation so that the magnetic fields extending between the two magnets have components which are continuously reversing directions parallel and tangential to the axis of rotation. Therefore, upon application of an initial motion, for example, rotary motion of the rotatably mounted magnet, the magnetic energy stored in permanent or electric magnets is harnessed and utilized for effecting rotation and reciprocation of the respective magnets.

The rotatably mounted magnet may be carried on a shaft which is journalled to opposite walls of a frame and the other magnet may be secured in a wheeled carriage within the frame and include an oversize bore for receiving the shaft therethrough in a non-engaging relationship so that the carriage is free to move without interference from the shaft.

Advantageously, attractive forces may be made to cooperate with repelling forces through the provision of a second multi-pole magnet on the shaft and a second multi-pole magnet secured to the carriage and through the disposition of the carriage and its magnets between the magnets which are mounted on the shaft and the proper positioning of the respective poles of the magnets whereby the carriage is attracted toward one shaft mounted magnet while simultaneously being repelled from the other shaft mounted magnet. The two carriage-mounted magnets may be constructed as a single with symmetrical pole arrangement and may, of course, be electro or permanent magnets.

It is well known that there is considerably more difficulty in parting attracted magnets by applying a force thereto in a direction opposite to that of the force of attraction than there is in moving a magnet perpendicularly to the force of attraction in order to sufficiently reduce the force to a level where the magnetic components may be easily separated. This consideration is utilized to great advantage in the present invention wherein means are provided for preventing abutment of attracted magnets so that the resulting small air gap renders the attracted magnets movable in relative rotation in response to the application of a relatively small rotating force. This movement is further enhanced as the attracted poles become rotationally displaced and the attractive forces decrease and become supplanted by repelling forces of the annularly adjacent opposite polarity magnetic poles.

A prime mover system, according to the present invention, although constructed for high output power requirements, may therefore operate with a relatively low input power to the shaft which is augmented by the harnessed energy of the permanent magnets.

One technique for applying rotary motion to the shaft may be realized through the provision of a small electric motor. For convenience, the motor may be mounted on the same frame as the magnetic system and have its output shaft aligned with and connected to the aforementioned magnet carrying shaft.

The prime mover system may be provided with a feedback system for converting the kinetic energy of the reciprocating members into a rotational motion for the shaft. The feedback system may include a reciprocating motion to rotary motion conversion device mounted on the frame and having an input member mechanically linked to the carriage and an output member coupled to the shaft. The coupling between the output member and the shaft may comprise a spring which can be wound for an angular displacement of at least one pole positioned so that with the motion conversion device adapted for unidirectional rotation, the application of a winding force to the spring in the opposite direction stores sufficient energy to provide an initial rotation of the shaft in the proper direction. The shaft may carry a fly wheel which functions, among other things, for receiving the application of a moment for winding the spring.

The prime mover system may be provided with a second type of feedback system including air compressor means mounted on the frame and connected to and operated by the reciprocating carriage, an air storage tank connected to the compressor means, an air motor having an output shaft connected to the magnet carrying shaft and an input for receiving compressed air from the storage tank, and means for regulating the pressure of the air supplied to the air motor. An initial operating pressure may be supplied from an air source, or, as explained below, from a pressure build up in response to operation of the system.

The foregoing and other objects, features and advantages of the invention, its organization, construction and operation, will best be understood from the following detailed description of preferred embodiments thereof taken in conjunction with the accompanying drawings in which.

MAGNETIC MOTION CONVERSION APPARATUS

Figure 1:
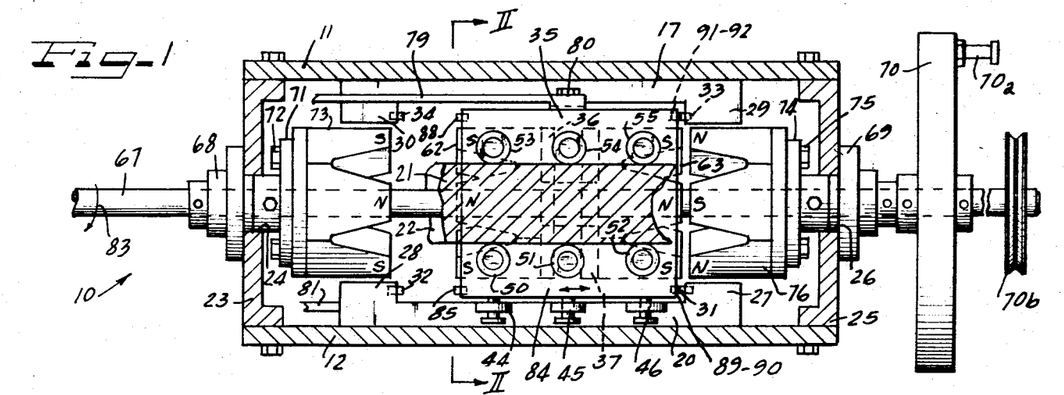
FIG. 1 is a top plan view of a magnetic motion conversion and power amplifying device constructed in accordance with the principles of the present invention, shown in a sectional view taken substantially along the line I—I of FIG. 2.
Figure 2:
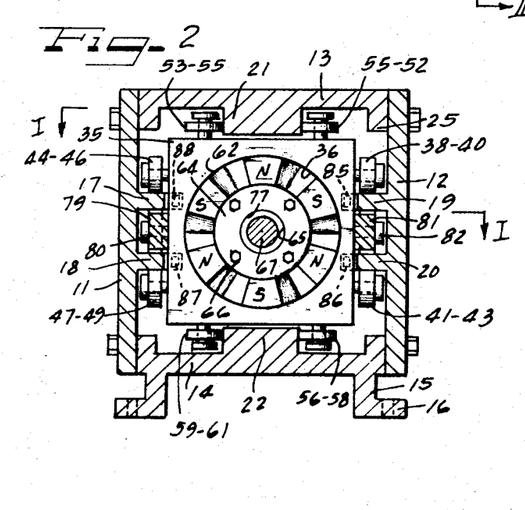
FIG. 2 is a sectional view of the apparatus of FIG. 1 taken along the line II—II.

Referring to FIGS. 1 and 2, a motion conversion apparatus is generally referenced 10 and comprises a frame having spaced side walls 11, 12, a top wall 13 and a bottom wall 14. The frame may include apparatus for securing the same to a supporting structure including L-shaped feet 15 having a corresponding bore (or bores) 16 for receiving suitable fastening devices.

The frame may be constructed of aluminum, for example, and includes a plurality of guide rails for supporting the reciprocating elements of the conversion apparatus. A first pair of guide rails 17, 18 projects from the inner surface of the side wall 11, a second pair of guide rails 19, 20 projects from the inner surface of the side wall 12, a guide rail 21 projects from the inner surface of the top wall 13 and a guide rail 22 projects from the inner surface of the bottom wall 14. The guide rails 17–22 extend longitudinally of the apparatus a distance greater than the travel of the reciprocating elements of the apparatus.

The frame also includes an end wall 23 having a bore 24, and an end wall 25 having a bore 26.

Each of the guide rails 17–20 includes a portion, such as portions 27–30, which extend into the path of travel of the reciprocating elements of the apparatus, i.e., a carriage 35. The last-mentioned portions carry resilient pads, such as pads 31–34 for engaging similar resilient pads, such as pads 85–92 to dampen the impact noise between the reciprocating and stationary elements and to define a minimum air gap between attracted ones of the permanent magnets.

The carriage 35 includes a pair of cavities 36, 37 and is rollingly supported on the guide rails 17–22 by means of a plurality of wheeled bearings 38–61. The wheeled bearings 38–61 are provided in pairs which embrace their respective guide rails as follows. The bearings 38–40 are paired with the bearings 41–43 and engage the upper surface of the guide rail 19 and the lower surface of the guide rail 20, respectively. The bearings 44–46 are paired with the bearings 47–49 and engage the upper surface of the guide rail 17 and the lower surface of the guide rail 18, respectively. The bearings 50–52 are paired with the bearings 53–55 and embrace opposite surfaces of the guide rail 21, while the bearings 56–58 are paired with the bearings 59–61 and engage opposite surfaces of the guide rail 22. The arrangement of the bearings 38–49 with respect to the guide rails 17–20 prevents vertical movements of the carriage 35 as it reciprocates, while the arrangement of the bearings 50–61 with respect to the guide rails 21, 22 provides lateral stability of the carriage 35.

A pair of multi-pole magnets 62, 63 are secured in respective ones of the chambers 36, 37 of the carriage 35. Each of these magnets includes a plurality of magnetic poles, here six poles, disposed in an annular configuration on a base 64 which has a bore 65 and which is secured to the carriage by a plurality of machine screws or bolts 66.

The base 64 includes a bore 65 of greater diameter than a shaft 67 for receiving the shaft 67 therethrough. The shaft 67 extends through the bores 24, 26 of the end walls 23, 25 and is rotatably mounted to the end walls 23, 25 by means of a pair of bearings 68, 69. The shaft further carries a pair of flange collars 71, 74 and a pair of multi-pole magnets 73, 76 which have a structure substantially identical to that of the magnets 62, 63 and which are secured to the respective flange collars 71, 74 by means of the respective machine screws or bolts 72, 75.

The multi-pole magnets 62, 63, 73, 76 have their poles annularly disposed about the axis of rotation of the shaft 67. Adjacent poles of each magnet are of opposite polarity and the poles of the magnets are annularly positioned so that the magnets 62, 73 are repelling while the poles of the magnets 63, 76 are attracting, as shown in FIG. 1. It should be noted that for each revolution of the shaft 67, the number of reciprocations of the carriage 35 is equal to one half the number of poles of a magnet. Therefore, in the particular construction shown in the drawings, three cycles of reciprocation are provided for each revolution of the shaft 67.

A fly wheel 70 may also be secured to the shaft 67 to aid in maintaining rotation of the shaft in a manner well known in the art and may be rotated by a handle 70a or by a pulley or gear system 70b.

The carriage 35 has a pair of reciprocating members 79, 81 connected to opposite sides thereof by way of respective pins 80, 82. Therefore, upon the application of rotary motion, referenced by the arrow 83, to the shaft 67, reciprocating motion, referenced by the double-headed arrow 84, of the carriage 35, may be effected. Conversely, the application of a reciprocating motion to the members 79, 81 will provide rotary motion of the shaft 67.

As the carriage 35 reciprocates between its extreme positions, as mentioned above, the impact pads, including pads 31–34 and 85–92 absorb impact and suppress noise while at the same time defining an air gap to permit ease in rotating the shaft 67. The bearings, shaft, flange collars and carriage are non-magnetic material and may include stainless steel or aluminum.

PRIME MOVER SYSTEM

Figure 3:
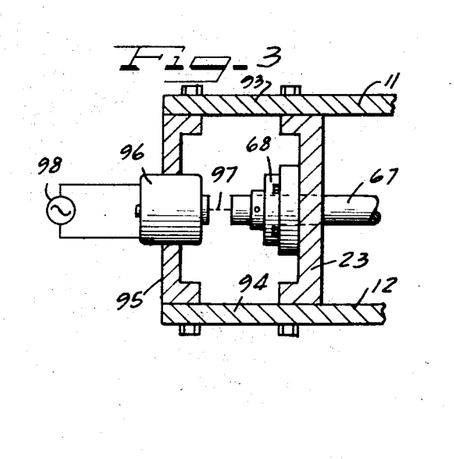
FIG. 3 is a partially pictorial and partially schematic diagram of an extension of the apparatus illustrated in FIG. 1 and having an electric motor linked to the shaft of the rotating magnets.

Referring now to FIG. 3, in conjunction with FIGS.

1 and 2, there is illustrated means for converting a relatively low power input to a higher power output through utilization of the above technique for harnessing the magnetic energy stored in the permanent magnets 62, 63, 73, 76. In FIG. 3, the side walls 11, 12 have been extended by the respective side wall extensions 93, 94, and an additional end wall 95 has been provided for mounting an electric motor 96. The electric motor 96 is mechanically connected to the shaft 67, as indicated at 97, and is electrically connected to an electrical supply 98. Inasmuch as the losses in the magnetic system discussed above are primarily limited to the bearing losses in rotating the shaft 67, the electric motor 96 need only be of a sufficient rating to just overcome these bearing losses. The mechanical energy delivered by the reciprocation of the carriage 35, which in practice may be many times the power output of the motor 96, may be utilized to perform work and/or aid in rotating the shaft 67 to perform work.

Figure 4:
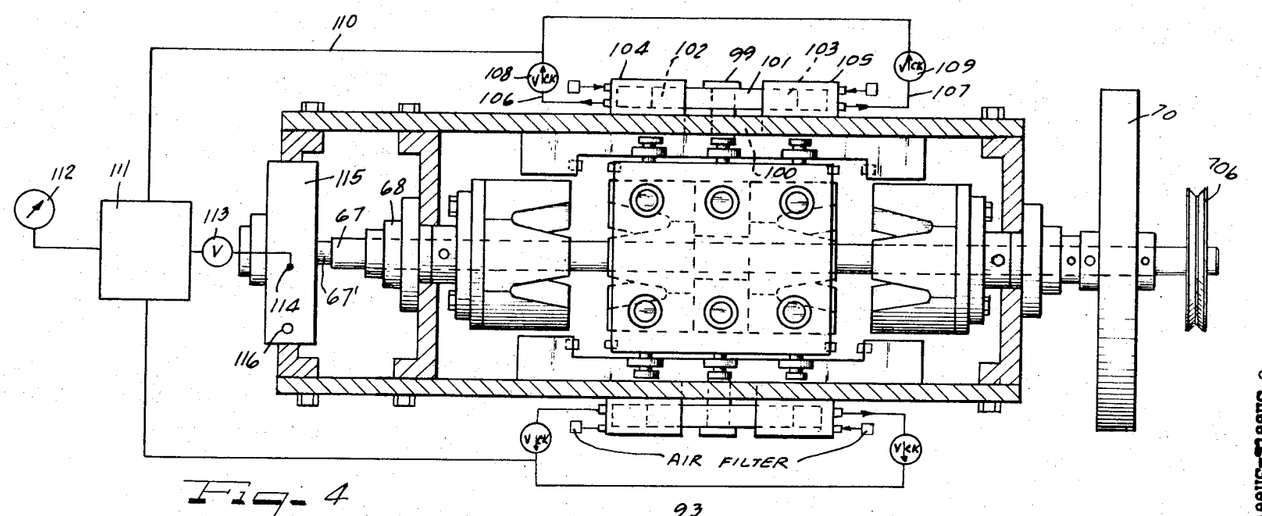
FIG. 4 is an illustration similar to FIG. 1 showing the utilization of a compressed air feedback system.

Referring to FIG. 4, which is generally the same view of the apparatus illustrated in FIG. 1, shown with the carriage 35 substantially at its midpoint of travel, a pneumatic feedback system is illustrated which comprises an extension 99 of the pin 80 secured to one side of the carriage 35 and extending through an elongate slot 100 in the side wall 11. It should be noted that in this feedback arrangement, the members 79, 81 are unnecessary and have been omitted. The pin 99 is connected to a piston rod 101 which has pistons 102, 103 at its opposite ends. The piston 102 is disposed in a cylinder 104 and the piston 103 is disposed in a cylinder 105. The cylinders 104, 105 may advantageously be secured to the side wall 11. The cylinders 104, 105, under the influence of the carriage 35, alternately draw in and discharge air. The air discharged from the cylinders 104, 105 is fed by way of tubing 106, 107 and respective check valves 108, 109, and by way of a common tube 110 to an air storage tank 111. The air storage tank 111 may be provided with an air pressure gauge 112 in order to provide a visual indication of the air pressure. The air storage tank 111 is further connected to an input port 114 of an air motor 115 by way of a regulating valve 113. The air motor 115 also includes an exhaust port 116. The air motor 115 has an output shaft connected to the shaft 67 and is operable in response to the application of air flow thereto to provide rotary motion of the shaft 67.

Figures 5, 6, 7:
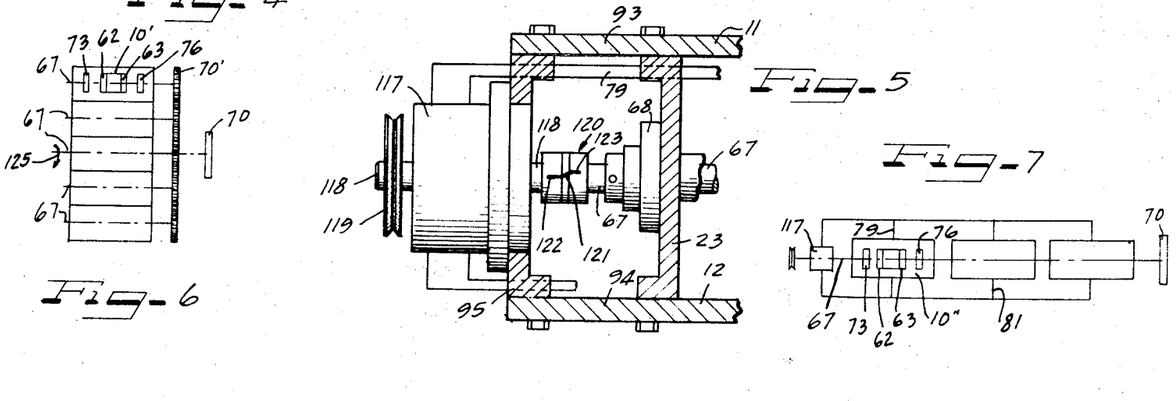
FIG. 5 illustrates an extension of the apparatus of FIG. 1 having a feedback system which utilizes a mechanical reciprocating to rotary motion conversion device coupled to the shaft.
FIG. 6 is a diagrammatic illustration of a plurality of the devices of FIG. 1 coupled in a side-by-side relationship and having magnetic pole phasing for effecting a power increase.
FIG. 7 is a diagrammatic illustration of a plurality of the devices of FIG. 1 coupled in a series relationship and having magnetic pole phasing for effecting a power increase.

Referring to FIG. 5, in conjunction with FIGS. 1 and 2, the side walls 11, 12 are again provided with respective side wall extensions 93, 94 and an additional end wall 95. The end wall 95 has mounted thereon a reciprocating to rotary motion converter or translating device. This device has an output shaft 118 and is illustrated in FIG. 5 as being provided with a pulley 119, or the like, for delivering output energy. With the motion conversion utilized through the provision of this device, an input is provided thereto by way of the reciprocating member 79 and by way of the other reciprocating member 81.

The output shaft 118 of the conversion device 117 is also coupled to the shaft 67 by means of a coupling device 120 which includes a spring 121 having its ends 122 and 123 fixed to the respective shafts 118, 67. The conversion device 117 is adapted for unidirectional rotation and the spring 121 may be wound an angular distance of at least one pole position in a direction opposite to the preferred direction of rotation. Winding may be accomplished by the application of a winding moment to the shaft 67, for example, at the fly wheel 70. Upon release of the winding moment, initial rotation of the shaft 67 and operation of the prime mover system is immediately effected in response to release of the energy stored in the spring 121. The permanent magnets are then utilized as a source of energy for driving the system and other needs, such as the system load.

MULTIPLE DEVICE SYSTEMS

It should be easily recognized that the magnetic forces of attraction and repulsion increase toward a maximum as the distance between magnets decreases. Therefore, if the angular disposition of the magnetic poles is provided on a staggered basis with respect to one set of magnets so that the carriages of a plurality of conversion devices are at different positions along their respective paths of travel, maximum power can be applied to coupled shafts of the devices. Power may also be increased or smaller magnets can be used if a plurality of devices are coupled to a single shaft.

FIGS. 6 and 7 diagrammatically illustrate coupled multiple devices wherein the coupling is effected through gears, or the like, or through utilization of a common shaft. Although not shown in each figure, feedback arrangements may be advantageously employed.

Referring to FIG. 6, a plurality of the above-described devices 10, here referenced 10', are provided in a side-by-side relationship and coupled together with a plurality of gears 70' which replace the respective fly wheels, and a single fly wheel 70 is provided for the system. In such a system at least one of the shafts 67 has a rotational motive force applied thereto as indicated by the arrow 125. The magnetic poles of each device are phased about the axis of rotation so that maximum forces of attraction and repulsion are sequentially applied to the shafts in a sequential manner similar to the firing sequence of an internal combustion engine so as to increase the total energy applied to the shafts.

In FIG. 7, the same is generally true for the structure of a combination of such devices 10'', with the exception that all of the rotary magnets are carried on the same shaft 67. With this structure, a plurality of smaller magnets may be utilized for a given power requirement in contrast to using a single device having large magnets.

Referring to FIGS. 8-11, a particular construction of a motion conversion device which may be utilized for the device 117 of FIG. 5 is illustrated in greater detail and generally referenced 200. The conversion device 200 includes a housing 201 having a pair of side walls 202, 203, a top wall 204, and a bottom wall 205 formed by connectible housing halves. An end wall 206 is provided with a pair of openings 206a, 206b as extensions of a pair of grooves 207, 208 in the top and bottom walls 204, 205, respectively.

A generally U-shaped member 209 includes a pair of arms 210, 211 which extend through the openings 206a, 206b and the grooves 207, 208 in a sliding relationship and which are interconnected by means of an arm 212. The arm 212 includes a projection 213 having a bore 214 for connection to an associated device, such as the member 79 of FIGS. 1 and 5. The arms 210, 211 have secured thereto a hollow cylinder 217 having at least one pin 218 projecting from its inner surface. The pin (or pins) 218 extend into a groove 219 which extends circumferentially about a hollow cylinder 220 which is carried on a shaft 221 and mounted for rotation by means of a pair of bearings 222, 223. The shaft 221 is adapted for delivering a rotary output to an associated device, such as the shaft 67 illustrated in FIGS. 1 and 5. The shaft may include a spring 224 (similar to spring 121 of FIG. 5) for effecting the desired coupling.

Figures 8, 9, 10, 11, 12, 13:
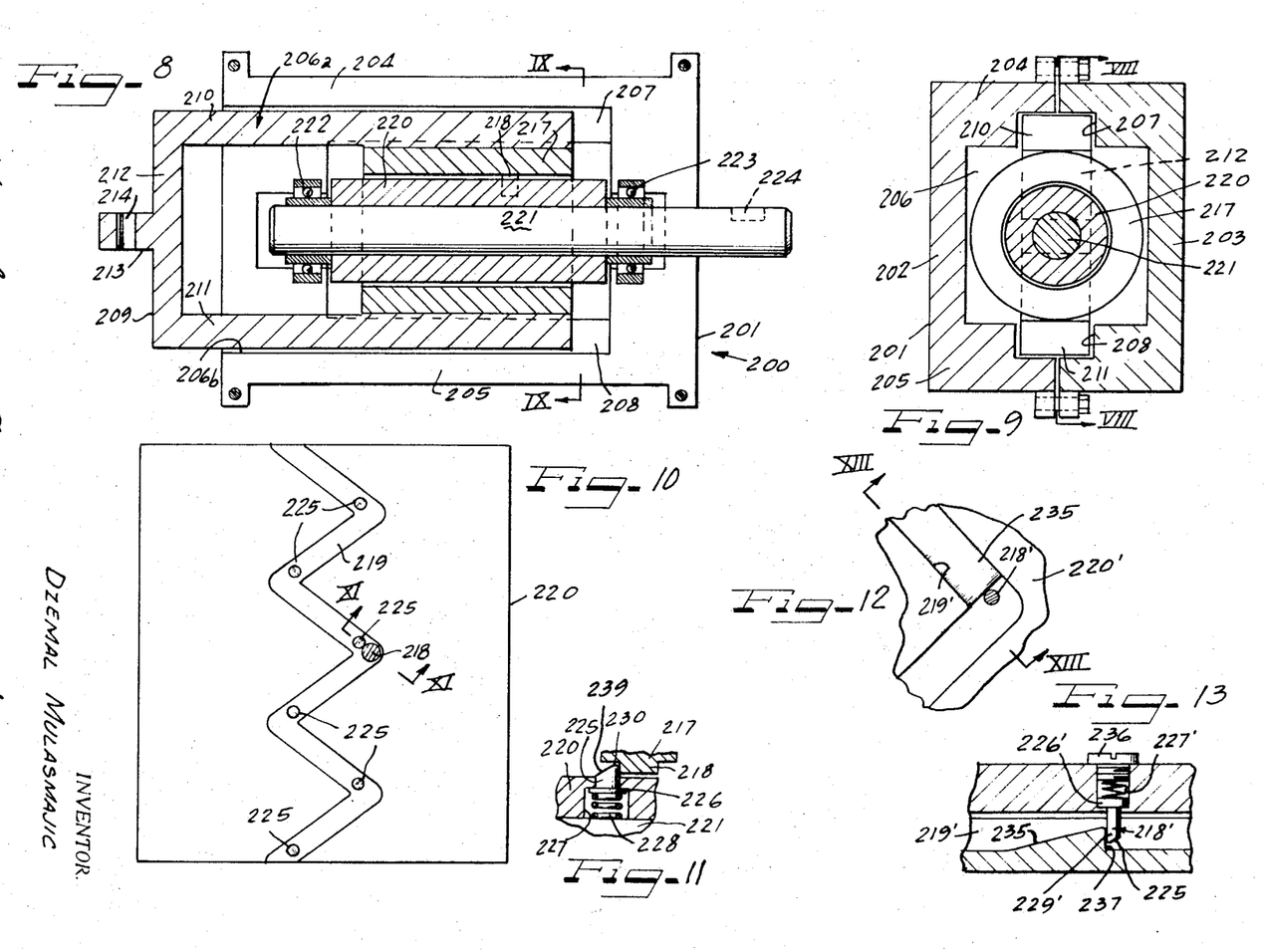
FIG. 8 is a sectional elevational view of a motion conversion device taken substantially along the line VIII—VIII of FIG. 9.
FIG. 9 is a sectional view of the apparatus of FIG. 8 taken substantially along the line IX—IX.
FIG. 10 illustrates a surface development of the rotary cylinder of the apparatus illustrated in FIG. 8.
FIG. 11 is an enlarged fragmentary sectional view taken generally along the line X—X of FIG. 8.
FIG. 12 is a planar representation of a fragmentary portion of another surface development wherein the groove for defining reciprocation limits has cam surfaces formed on the bottom thereof.
FIG. 13 is a sectional view taken substantially along the line XIII—XIII of FIG. 12.

Referring specifically to FIGS. 10–11, the groove 219 is illustrated as having a sawtooth configuration which extends circumferentially about the hollow cylinder 220. When operated as a reciprocating to rotary motion converter, the pin 218 functions as a cam and the groove 219 functions as a cam follower; conversely, when operating to convert rotary to reciprocating motion, the groove 219 functions as a cam and the pin 218 functions as a cam follower.

The apparatus of the present invention is preferred to have unidirectional rotation in response to the application of a reciprocating input. Means are therefore provided for allowing rotation in only one direction. A plurality of spring-loaded pins 225 are provided immediately adjacent each point of the sawtooth groove 219 and extend from the bottom of the groove outwardly. Each of these spring-loaded pins includes a head 226 seated in a counterbore 227. A spring is positioned in the counterbore 227 between the head 226 and the shaft 221. The pin 225 further includes an inclined plane portion 229 which is inclined in the direction of travel of the pin 218 whereby the pin 218 depresses the pin 225 by camming the surface 229 until the pin passes the edge 230 and is prevented from returning in the opposite direction by the spring 228 which restores the pin 225 to an extended position.

Referring to FIGS. 12 and 13, a different restriction mechanism is illustrated wherein a cylinder 220' includes a groove 219' which has an inclined ramp 235 extending from the bottom of the groove adjacent each point of the sawtooth. The outer member, here referenced 217', carries at least one spring-loaded pin 218'. The pin 218' includes a head portion 226' mounted in a counterbore 227' and a spring 228' is positioned between the head 226' and a screw 236. The pin 218' includes a surface 229' for striking and riding along the inclined ramp 235. After the pin passes the ramp, travel in the opposite direction is prevented as the pin engages the surface 237. The ramps are formed as a part of the cylinder and the moving parts for motion restriction are restricted to one or more such assemblies as concern the pin 218'; whereas, in the apparatus of FIGS. 10 and 11, moving parts are required at each change in direction of the groove 219.

It is sometimes desirable to transmit motion through a barrier whereby the motion receiving device may be utilized in a clean or sterile area, e.g. clean room and surgical facilities. The present invention is readily adaptable to such a requirement in that physical connection is not necessary between the rotating and reciprocating magnets and such elements may be mounted on respective sides of a non-magnetic barrier, e.g., glass, aluminum. For example, the rotary magnet and its load may be located within a sterile area adjacent the barrier and the other magnet may be moved toward and away from the barrier by lever means either manually or by motor. Conversely, the rotary magnet may be mounted for operation outside the sterile area and the other magnet may be mounted within the sterile area for driving a load.

Although I have described my invention by reference to specific illustrative embodiments thereof, many changes and modifications of my invention may become apparent to those skilled in the art without departing from the spirit and scope thereof, and it is to be understood that I intend to include within the patent warranted hereon all such changes and modifications as may reasonably and properly be included within the scope of my contribution to the art.

I claim:

1. Motion conversion apparatus comprising:
a first input/output member mounted for rotary motion about an axis;
a second input/output member mounted for reciprocating motion between a pair of limits; and
at least one pair of permanent magnets mounted on respective ones of said input/output members for movement therewith, each of said magnets including a plurality of alternate polarity magnetic poles disposed about the axis of rotation and facing the poles of the other said magnet for attracting and repelling said magnets and effecting the corresponding motion of one of said magnets in response to the application of the respective motion to the input/output member of the other said magnet.

2. Apparatus according to claim 1, wherein each of said magnets comprises:
a plurality of shaped magnetic portions each having first and second ends, the second end having a smaller cross-sectional area than the first end and the second ends being the facing poles of the magnets; and
a circular base portion secured to the respective input/output member, said first ends extending from said base plate parallel to its axis to form a generally annular configuration.

3. A permanent magnet comprising:
a plurality of shaped magnetic portions each having first and second ends, the second ends having smaller cross-sectional areas than the first ends; and
a circular base portion, said first ends extending from said base plate parallel to its axis to form a generally annular configuration with adjacent second ends having alternate magnetic polarities.

4. A permanent magnet according to claim 3, wherein each of said shaped magnetic portions are bonded to said base portion and to adjacent shaped portions and includes
a pair of spaced arcuate surfaces adjacent said first and second ends,
a pair of spaced second surfaces connecting said arcuate surfaces and generally lying in intersecting planes, and a pair of spaced flat surfaces connecting said second surfaces and said first end and abutting like surfaces of the adjacent shaped portions.

5. A prime mover system comprising:
a a first member mounted for rotary motion about an axis;
means for rotating said first member;
a second member mounted for reciprocating motion between a pair of limits;
a first permanent magnet connected to said first member for rotation therewith; and a second permanent magnet connected to said second member for reciprocation therewith;

each of said first and second magnets including a plurality of alternate polarity magnetic poles disposed about the axis of rotation of said first member and facing the poles of the other said magnet for attracting and repelling said magnets and urging the reciprocation and rotation of the respective magnets upon rotation of said first member.

6. A prime mover system according to claim 5, wherein said means for rotating said first member comprises an electric motor connected to said first member.

7. A prime mover system comprising:

a frame including a top wall, a bottom wall, a pair of side walls, a pair of end walls and a plurality of guide rails extending from said top, bottom and side walls;

a shaft rotatably mounted to said end walls;

means for rotating said shaft;

a carriage within said frame including a plurality of pairs of wheels embracing said guide rails and supporting said carriage, said carriage including a bore therethrough, said shaft extending through said bore; and first and second pairs of magnets, said first pair of magnets mounted on said shaft for rotation therewith, said second pair of magnets mounted on said carriage, each of said magnets including a plurality of alternate polarity magnetic poles annularly disposed about said shaft, the poles of individual magnets of said first pair facing the poles of respective magnets of said second pair and further annularly positioned to provide attraction between two of the facing magnets and repulsion between the other two facing magnets.

8. A prime mover system according to claim 7, wherein said carriage includes first resilient means, said guide rails include portions which extend in an interference relationship with said carriage, and second resilient means carried on said guide rail portions for impact by said first resilient means to absorb impact of said carriage with said guide rail portions and to prevent impact of the facing magnets.

9. A prime mover system according to claim 7, comprising a fly wheel connected to said shaft for rotation therewith.

10. A prime mover system comprising:

a plurality of first members each mounted for rotation about a respective axis;

means coupling said first members for concurrent rotation;

means coupled to at least one of said first members for rotating said first members;

a plurality of first magnets each connected to a respective first member for rotation therewith;

a plurality of second members each mounted for reciprocation and each associated with a respective first member; and a plurality of second magnets each connected to a respective second member for reciprocation therewith, each of said first and second magnets including a plurality of alternate polarity magnetic poles disposed about the axis of rotation of the respective first member and facing the magnetic poles of the magnet which is associated therewith via said first and second members for attracting and repelling the associated magnet and effecting reciprocation and rotation of the respective magnets upon rotation of said first members, the magnets positioned on their respective members with each pair of facing magnets having its poles at a unique angular disposition so that the magnetic attraction and repulsion are phased with respect to said first members to increase the total power delivered to said first members.

11. A prime mover system comprising:

a first member mounted for rotation about an axis;

means for rotating said first member;

a plurality of second members mounted for reciprocation; and a plurality of first magnets and a plurality of second magnets, said second magnets carried on said second members and said first magnets carried on said first member in spaced pairs with each of said second members and the second magnets carried thereby disposed between respective pairs of said first magnets;

each of said magnets including a plurality of magnetic poles annularly disposed about the axis of rotation of said first member with the poles of each first magnet facing the poles of a respective second magnet, adjacent poles of each magnet having opposite magnetic polarities for attracting and repelling said magnets and urging corresponding reciprocating and rotary movements thereof, and the magnetic poles of each pair of attracting and repelling associated magnets uniquely angularly positioned to effect maximum energy transmission to said first member.

12. In a motion conversion apparatus of the type including a first part mounted for reciprocation, a second part mounted for rotation about an axis, and cooperable means carried on both of the parts for effecting a camming action to transmit motion between the parts in response to the application of a motive force to one of the parts, the improvement therein comprising:

motion restriction means carried by one of the parts and mounted for movement relative thereto only in response to engagement thereof by the means carried on the other part moving in a predetermined direction to restrict relative movement of the part to a predetermined directional relationship.

13. In a motion conversion apparatus as set forth in claim 12, wherein the second part includes a rotatably mounted cylinder including a continuous circumferentially extending groove having a wall configuration defining limits of reciprocation of the first part, the improvement of said motion restriction means further defined as comprising a spring-loaded pin means extending into the groove and biased into a yieldable interference relationship with respect to the predetermined directional relationship and the means carried on the other part.

14. In a motion conversion apparatus as set forth in claim 13, wherein the means carried on the other part comprises a cam pin carried on said first part and extending into said groove, and said pin means is carried on said second part and includes a camming surface oblique to the direction of travel of said cam pin for sliding engagement therewith.

15. In a motion conversion apparatus as set forth in claim 13, wherein said groove includes a cam surface adjacent each limit defined by said wall configuration and said spring-loaded pin means is carried on said first part.

16. In a motion conversion device of the type having a first member mounted for reciprocation and carrying a cam pin, a cylindrical second member mounted for rotation about an axis and including a circumferentially extending sawtooth-shaped groove receiving the cam pin and operative as a cam follower in response to movement of the cam pin along a line parallel to the axis of rotation, the improvement therein comprising:

means for permitting only unidirectional motion of said cylindrical second member, including, immediately adjacent each point of the sawtooth-shaped groove, a restrictor pin mounted in said groove and having a surface inclined in one direction of travel of the cam pin, and biasing means for urging said restrictor pin into the path of travel of said cam pin, said cam pin operable to depress said restrictor pin while in engagement with said inclined surface and said restrictor pin effective to prevent passage of said cam pin in the direction opposite to said one direction.

17. Motion conversion apparatus, comprising:
a frame;
a first input/output member mounted in said frame for rotation about an axis;
a carriage mounted in said frame for reciprocation between a pair of limits;
a second input/output member carried by said carriage for reciprocation therewith; and
at least one pair of magnets mounted on respective ones of said input/output members for movement therewith, each of said magnets including a plurality of alternate polarity magnetic poles disposed about the axis of rotation and facing the poles of the other said magnet for attracting and repelling said magnets and effecting the corresponding motion of one of said magnets in response to the application of the respective motion to the input/output member of the other said magnet.

18. Apparatus according to claim 17, comprising a fly wheel secured to said shaft for rotation about said axis.

19. Apparatus according to claim 17, wherein
said frame includes spaced end walls,
said magnet carried by said carriage includes a bore therein having a diameter greater than the diameter of said shaft, and
said shaft extends through said bore and is rotatably mounted to said end walls.

20. Apparatus according to claim 17, wherein
said frame includes guide rail means, and
said carriage includes a plurality of wheels for rollingly supporting said carriage on said guide rails means.

21. Apparatus according to claim 20, wherein
said frame includes a top wall, a bottom wall and a pair of side walls,
said guide rail means includes a plurality of rail members extending from said walls, and
pairs of said wheels embracing said rail members.

22. A prime mover system comprising:
a first member mounted for rotary motion about an axis;
means for rotating said first member;

a second member mounted for reciprocating motion between a pair of limits;
a first magnet connected to said first member for rotation therewith;
a second magnet connected to said second member for reciprocation therewith;
each of said first and second magnets including a plurality of alternate polarity magnetic poles disposed about the axis of rotation of said first member and facing the poles of the other said magnet for attracting and repelling said magnets and urging the reciprocation and rotation of the respective magnets upon rotation of said first member;
a third magnet connected to said first member for rotation therewith; and
a fourth permanent magnet connected to said second member for reciprocation therewith;
said third and fourth magnets also including a plurality of alternate polarity magnetic poles disposed about the axis of rotation and facing the poles of the other, the magnetic poles positioned so that said first and second magnets attract when said third and fourth magnets repel.

23. A prime mover system comprising:
a frame;
a carriage mounted in said frame for reciprocation between a pair of limits;
a first member mounted for rotary motion about an axis, said first member including a shaft rotatably mounted in said frame;
a second member mounted in said carriage for reciprocation therewith;
a first magnet connected to said shaft for rotation therewith; and
a second magnet connected to said second member and carried by said carriage for reciprocation therewith,
each of said first and second magnets including a plurality of alternate polarity magnetic poles disposed about the axis of rotation of said first member and facing the pole of the other said magnet for attracting and repelling said magnets and urging the reciprocation and rotation of the respective magnets upon rotation of said first member.

24. A prime mover system according to claim 23, wherein said means for rotating said first member includes a feedback arrangement which comprises means for converting reciprocating motion to rotary motion connected between said second member and said first member.

25. A prime mover system according to claim 24, wherein said converting means includes an output shaft, and means coupling said output shaft to said shaft of said first member including spring means connecting said two shafts.

26. A prime mover system according to claim 14, wherein said means for converting reciprocating motion to rotary motion comprises:
a rotatably mounted cylinder connected to said first member and including a continuous, sawtooth-shaped circumferentially extending groove;
an arm connected to said second member; and
a tubular member connected to said arm and disposed about said cylinder, said tubular member having at least one pin extending therefrom and into said groove to cam said cylinder into rotation upon movement of said second member;

said cylinder including, adjacent each point of the sawtooth groove, a spring-loaded pin having a surface inclined in the direction of travel to insure movement of said pin in one direction along said groove.

27. A prime mover system according to claim 23, wherein said means for rotating said first member includes a feedback arrangement which comprises:

air compressor means connected to and operated by said second member;

an air storage tank connected to said air compressor means; and an air motor connected to said first member and connected to said air tank to receive an operating air flow.

28. A prime mover system according to claim 27, comprising check valve means interposed between said compressor means and said air storage tank.

29. A prime mover system according to claim 27, comprising a flow regulation valve interposed between said tank and said air motor.

* * * * *